(12) United States Patent
Werner et al.

(10) Patent No.: US 9,937,628 B2
(45) Date of Patent: Apr. 10, 2018

(54) SAFETY DEVICE FOR A MECHANICAL MOTION DEVICE

(71) Applicant: The Procter & Gamble Company, Cincinnati, OH (US)

(72) Inventors: Jeffrey Kyle Werner, Liberty Township, OH (US); Alexander Cyrus Salimian, Cincinnati, OH (US); Robert Scott Bollinger, Stewartstown, PA (US); Robert Paul Gordon, Quincy, MA (US); Keith Andrew Swenson, Milton, MA (US)

(73) Assignee: The Procter & Gamble Company, Cincinnati, OH (US)

( * ) Notice: Subject to any disclaimer, the term of this patent is extended or adjusted under 35 U.S.C. 154(b) by 344 days.

(21) Appl. No.: 14/636,527

(22) Filed: Mar. 3, 2015

(65) Prior Publication Data

US 2016/0257005 A1    Sep. 8, 2016

(51) Int. Cl.
*B25J 19/06*    (2006.01)
*B25J 13/08*    (2006.01)
(Continued)

(52) U.S. Cl.
CPC .......... *B25J 19/063* (2013.01); *B25J 9/1676* (2013.01); *B25J 13/086* (2013.01); *B25J 15/04* (2013.01)

(58) Field of Classification Search
CPC ......... B25J 19/063; B25J 9/1676; B25J 15/04
(Continued)

(56) References Cited

U.S. PATENT DOCUMENTS 4,397,372 A  *  8/1983  De Kraker ............ B60R 19/483
                                                180/277
4,596,412 A  *  6/1986  Everett .................. B60R 19/42
                                                200/52 R
(Continued)

FOREIGN PATENT DOCUMENTS

DE       102010010873 A1    5/2011
WO    WO 2003/013783 A1    2/2003
(Continued)

OTHER PUBLICATIONS

International Search Report and Written Opinion dated May 3, 2016, 10 pages.

*Primary Examiner* — Patrick H Mackey
(74) *Attorney, Agent, or Firm* — Jeffrey V Bamber

(57) ABSTRACT

A safety device for a mechanical motion device and a method for protecting a person or object in the vicinity of a mechanical motion device are described herein. The safety device may include: a shroud; a coupling mechanism; and a detection device. The coupling mechanism joins the shroud in a displaceable manner to a mechanical motion device. The detection device is configured for communication with the safety control system of a mechanical motion device. The detection device is capable of detecting misalignment of the shroud from its initial aligned position and/or a collision between the shroud and a person or object. The detection device may send a signal to the safety control system of the mechanical motion device to at least slow the movement of the mechanical motion device before the mechanical motion device reaches the location of the collision of the shroud with an object or person.

1 Claim, 4 Drawing Sheets

(51) Int. Cl.
 *B25J 15/04* (2006.01)
 *B25J 9/16* (2006.01)

(58) Field of Classification Search
 USPC .......................................................... 700/255
 See application file for complete search history.

(56) References Cited

U.S. PATENT DOCUMENTS

| | | | |
|---|---|---|---|
| 4,639,184 A | 1/1987 | Kansel et al. | |
| 4,661,038 A * | 4/1987 | Kohler | B25J 19/063 248/900 |
| 4,951,985 A * | 8/1990 | Pong | B60R 19/483 200/61.43 |
| 4,967,862 A * | 11/1990 | Pong | A47L 5/362 15/319 |
| 5,016,409 A * | 5/1991 | Sato | F16F 7/104 52/167.2 |
| 5,324,948 A * | 6/1994 | Dudar | G01S 15/931 250/253 |
| 5,484,219 A | 1/1996 | Drew et al. | |
| 5,775,750 A * | 7/1998 | Gauci | B25J 19/063 180/274 |
| 5,782,445 A | 7/1998 | Cleek | |
| 5,913,919 A * | 6/1999 | Bauer | G05D 1/0238 180/169 |
| 5,954,446 A | 9/1999 | Ireland | |
| 6,443,509 B1 * | 9/2002 | Levin | A01D 34/008 200/61.43 |
| 6,809,490 B2 * | 10/2004 | Jones | G05D 1/0219 318/568.12 |
| 6,847,181 B2 | 1/2005 | Brooks et al. | |
| 7,079,923 B2 * | 7/2006 | Abramson | F04D 29/30 180/167 |
| 7,167,775 B2 * | 1/2007 | Abramson | F04D 29/30 180/167 |
| 8,230,754 B2 * | 7/2012 | Song | B25J 19/063 74/470 |
| 8,508,329 B2 * | 8/2013 | Veenstra | G05D 1/0227 180/168 |
| 2014/0026898 A1 * | 1/2014 | Limonadi | A61F 5/013 128/869 |
| 2017/0048286 A1 * | 2/2017 | Ichihashi | G06F 13/00 |

FOREIGN PATENT DOCUMENTS

| | | |
|---|---|---|
| WO | WO 2006/117025 | 11/2006 |
| WO | WO 2009/080373 A1 | 7/2009 |

* cited by examiner

SAFETY DEVICE FOR A MECHANICAL MOTION DEVICE

FIELD OF THE INVENTION

A safety device for a mechanical motion device and a method for protecting a person or object in the vicinity of a mechanical motion device are described herein.

BACKGROUND

Mechanical motion devices include, but are not limited to: pneumatic arms, robots, and other mechanical moving elements. Safety features for mechanical motion devices are described in the patent literature, including in the following patent publications: U.S. Pat. Nos. 4,639,184; 5,484,219; 5,782,445; 5,954,446; 6,847,181 B2; and PCT Patent Publications: WO 2003/013783 A1; WO 2006/117025; and WO 2009/080373 A1. Some of these publications describe break-away clutches, couplings, and mechanisms to protect the mechanical motion device and/or the end of arm tooling in the event of a collision with another object. Several of these mechanisms are directed to decoupling a portion of the mechanical motion device from the remainder of the device. For example, such mechanisms may decouple a robotic arm from the remainder of the robot.

Collaborative robots (or CoBots) are robots that are intended to work alongside humans in a shared workspace without traditional safety guarding or cages. CoBots are a relatively new technology and provide unique safety problems. As such, evolving industry regulations are requiring that CoBot safety does not solely rely on the force detection inherent to the CoBot. While some of the publications listed above describe collision safety features that are designed to stop the movement of a mechanical motion device when the mechanical motion device makes contact with an object that results in a force being applied to the mechanical motion device, such a collision detection mechanism may not be suitable for devices which come into contact with a human. The forces may be too high, and the end of arm tool may be too rigid which may cause the person in the vicinity of the mechanical moving device to be injured if they are relying on such a collision detection mechanism for their personal safety. Therefore, it is believed that such collision detection mechanisms would not be considered to be safety rated for human protection. Currently, in order to compensate for the shortcomings of such mechanical motion devices, humans working in close proximity with mechanical motion devices are often placed behind safety guarding or cages.

The search for improved safety features for mechanical motion devices has, therefore, continued. There is a need for a safety device for mechanical motion device that is capable of isolating the energy of the mechanical motion device from a collision with an external element or person. Further, there is a need for a safety device for a mechanical motion device that can be safety rated for human protection in lieu of traditional safety guarding or cages.

SUMMARY

A safety device for a mechanical motion device and a method for protecting a person or object in the vicinity of a mechanical motion device are described herein. The safety device may be for a mechanical motion device which has a safety control system. The safety device may comprise: a shroud having an initial aligned position; a coupling device for joining the shroud in a displaceable manner to a mechanical motion device; and a detection device configured for communication with the safety control system of a mechanical motion device. The detection device is capable of detecting at least one of: misalignment of the shroud from its initial aligned position and/or a collision between the shroud and a person or object. The detection device or a component in communication therewith, may send a signal to the safety control system of a mechanical motion device to stop or slow the movement of the mechanical motion device.

The method for protecting a person or object in the vicinity of a mechanical motion device may comprise the steps of:
a. providing a mechanical motion device which has a safety control system and a working end, and providing said mechanical motion device with a safety device, said safety device comprising:
   i. a shroud disposed adjacent at least one side of the working end of the mechanical motion device;
   ii. a coupling device for joining the shroud in a displaceable manner to the working end of said mechanical motion device;
b. detecting at least one of the following: misalignment of the shroud and/or a collision between the shroud and a person or object;
c. sending a signal to the safety control system of the mechanical motion device to stop or slow the movement of the mechanical motion device; and
d. stopping or slowing the movement of the mechanical motion device.

DETAILED DESCRIPTION

The inventions described herein are directed to a safety feature (or "safety device") for use with a mechanical motion device and a method for protecting a person or object in the vicinity of a mechanical motion device. This invention may also relate to a mechanical motion device with such a safety feature thereon.

The mechanical motion device may be any suitable device that is capable of moving articles. Mechanical motion devices include, but are not limited to: independently actuatable automatic arms, pneumatic arms, robots, and other mechanical moving elements. Suitable types of robots include, but are not limited to: parallel kinematics robots, spider or Delta robots, six-axis robots, and SCARA robots. The safety device may, for example, be used with 6-axis Collaborative Robots such as the Universal Robots UR10 & UR5 model robots available from Universal Robots USA, Inc. of Odense S, Denmark.

The mechanical motion device may be actuated in any suitable manner including, but not limited to: mechanically, electrically, and combinations thereof, and is not limited to devices that are mechanically actuated. The mechanical motion device may also be programmable. Although the present application may describe the mechanical motion device in the context of a robot, the present invention is not limited to use with a robot, and it can be used with any type of mechanical motion device.

Figure 1:
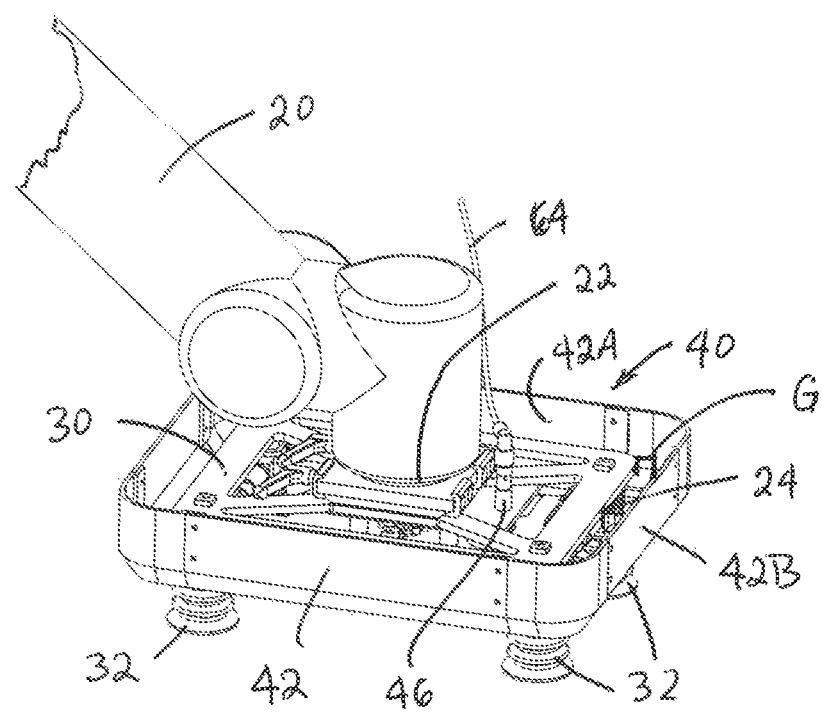
FIG. 1 is a perspective view showing a portion of one embodiment of a mechanical motion device with one embodiment of the safety device thereon.

FIG. 1 shows one non-limiting example of a safety feature on a mechanical motion device (only a portion of the mechanical motion device is shown). The mechanical motion device comprises a robot having an arm 20 with a proximal end (which is conventional and not shown) and a distal end 22. An end effector 24 is joined to the distal end 22 of the arm 20.

The mechanical motion device can use any type of end effector 24 that is suitable for the tasks for which the mechanical motion device is being used. Suitable end effectors include, but are not limited to grippers of various configurations. Grippers can be used for gripping articles so that the mechanical motion device may pick up one or more articles, and reorient them and/or move the article(s) to a new location. In certain embodiments, articles may comprise containers (which may be empty, or at least partially filled), devices and other objects. In some cases, the articles are picked from a conveyance device and placed for subsequent treatment thereof at one or more treatment stations along a production line. Such treatment stations include but are not limited to stations for labeling, filling, capping and sealing the articles, which stations can electively treat the properly positioned articles in succession for eventual delivery from a manufacturing site. The safety device is not limited to such a use, and can be used for any other purposes for which mechanical motion devices are generally used. In the particular embodiment shown, the end effector 24 is vacuum pump-gripper device that is used for moving cases of products. The particular type of end effector is not critical to the safety feature described herein.

Figure 2:
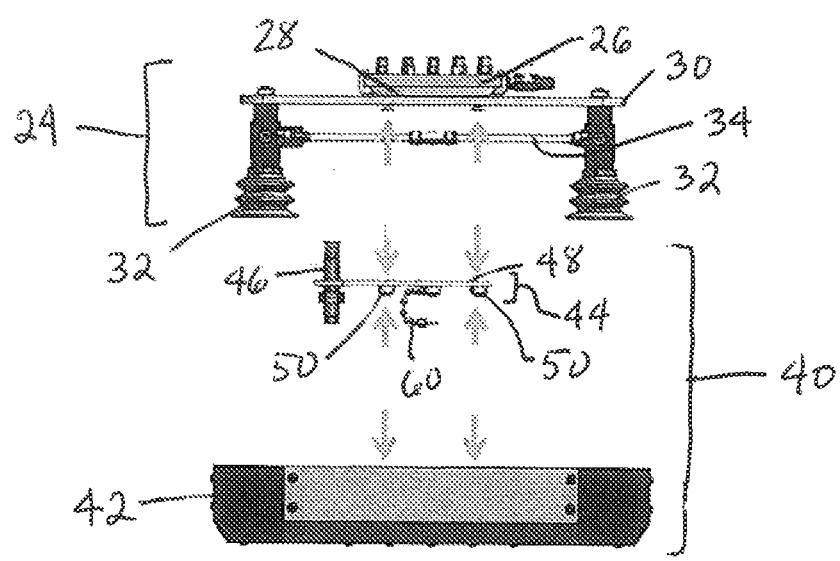
FIG. 2 is an exploded view, taken from the side, of the safety device and part of the end effector of the mechanical motion device.
Figure 3:
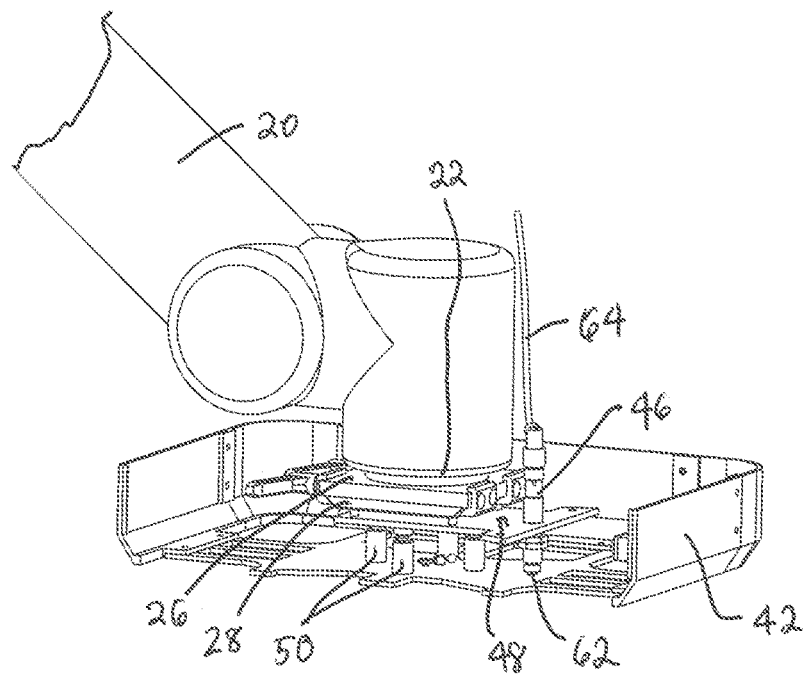
FIG. 3 is partially fragmented perspective view showing the safety device on the end of the arm of a mechanical motion device (shown without an end effector).
Figure 4:
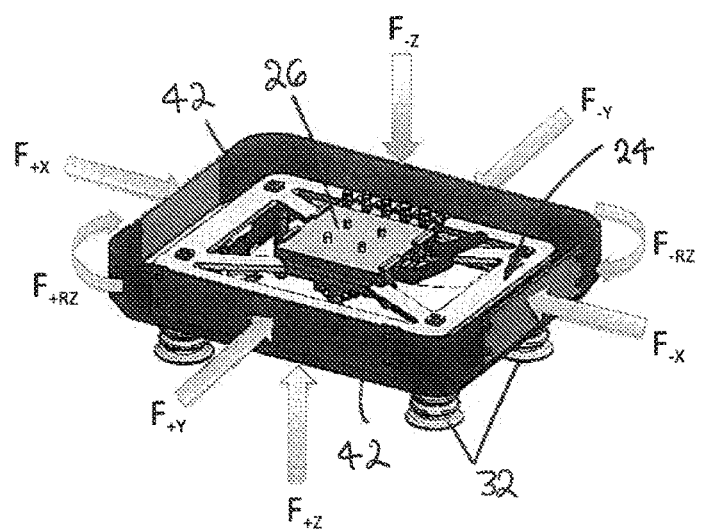
FIG. 4 is a perspective view of the safety device and end effector, showing the directions in which forces may be exerted on the shroud of the safety device.

FIG. 2 shows the components of this particular end effector 24. The end effector 24 in the particular embodiment shown in FIGS. 1 and 2 comprises a quick release plate 26, a mounting plate 28, a vacuum cup plate 30, four vacuum pump-gripper assemblies 32, air supply lines 34, and a vacuum switch (which is conventional and not shown).

The safety device 40 comprises a displaceable shroud (or "shield) 42, a coupling device or mechanism 44 configured for joining the shroud 42 in a displaceable fashion to the mechanical motion device (in this case, to the distal end 22 of the arm 20), and a detection device 46 configured for at least indirect communication with the safety control system of the mechanical motion device.

The term "shroud" is used in the sense that it refers to an element that at least partially covers, or screens, or guards something. The shroud 42 can have any suitable configuration, and can have any suitable properties. The shroud 42 is typically not an integral component of the mechanical motion device or the end effector as those devices are currently provided. That is, the shroud 42 may be a separate component that is provided which is distinct from breakaway robotic arms, breakaway end effectors, and the like that have been disclosed in patent publications. Of course, the shroud 42 and other features of the safety device described herein can henceforth be provided as components of mechanical motion devices or the end effectors therefor.

The shroud 42 may be configured so that it is disposed on at least one side of the end effector 24 (that is, on the working end) of the mechanical motion device. The configuration of the shroud 42 may depend on what is needed to provide protection from the motion of the mechanical motion device, or other conditions. The shroud 42 may be configured so that it at least partially surrounds the end effector 24. In certain embodiments, the shroud 42 may be configured so that it completely surrounds the end effector 24 of the mechanical motion device on four sides. Of course, it is understood that the shroud 42 itself can be of any suitable configuration so that it may not have linear sides (for instance, if the shroud is round or oval). The shroud 42 may be sized so that it aligns with (that is, extends to) the distal end of the end effector 24 and, thus, effectively surrounds the end effector 24 on five sides. The distal end of the end effector is the portion of the end effector 24 spaced furthest from the distal end 22 of the arm 20. In the particular embodiments shown, the shroud 42 extends past the vacuum cup plate 30 and the air supply lines 34, but the pump-gripper assemblies 32 protrude outward from the shroud 42. The shroud 42, thus, in this case, partially surrounds the distal end of the end effector 24.

The shroud 42 may be lightweight so that it does not add significantly to the weight of the end effector 24. The shroud 42 has an inside surface 42A and an outside surface 42B. Providing a lightweight shroud 42 will also minimize the chance that the shroud 42 will injure a person if the outside surface 42B of the shroud comes into contact with a person. The shroud 42 may, thus, serve as a bumper. The shroud 42 is preferably made of a relatively soft material, and may have portions that are rounded, or otherwise free of sharp corners. Suitable materials for the shroud 42 include, but are not limited to plastic, carbon-fiber, and polyurethane.

The shroud 42 can be of any suitable size. The shroud 42 may be larger than the distal portion of the end effector so that it at least partially surrounds the distal end of the end effector. In addition, as shown in FIG. 1, it may be desirable for the shroud 42 to be oversized so that there is a space or gap, G, between the inside surface 42A of the shroud 42 and the adjacent portion of the end effector. This will provide a buffer space that, as described in further detail below, will allow the mechanical motion device to decelerate after the shroud 42 contacts a person or an object so that no part of the mechanical motion device continues its motion and contacts the object or person. Alternatively, if the mechanical motion device continues its motion and contacts the object or person, it is moving slowly so that it causes no damage or injury to the object or person. It may also be desirable, in some cases, for the shroud 42 to have dimensions that are larger at least in one plane, than the article or work piece that the mechanical motion device will be manipulating. The shroud 42 may further be scalable depending on the tooling selected. That is, the safety shroud 42 and coupling device 44 can easily be made larger or smaller to accommodate the end effector which it surrounds and the dynamics of different mechanical motion devices.

The coupling device 44 can be any suitable type of device that is configured for coupling (that is, joining) the shroud 42 in a displaceable manner or fashion to the mechanical motion device. The term "displaceable", as used herein, refers to a manner of joining the shroud in which the shroud has an initial position (such as an initial aligned position) and a displaced position which differs from the initial position. There are numerous ways of joining the shroud in a displaceable manner to the mechanical motion device. These include, but are not limited to: a breakaway (or separable) connection, a pivotable connection, and a translatable connection. For the purposes of this disclosure, joining the shroud 42 to the end effector will be considered joining the shroud 42 to the mechanical motion device.

The particular coupling device 44 shown in FIG. 2 comprises a breakaway coupling device which may comprise several components. It should be understood that other types of coupling devices may have alternative and/or fewer components. This particular coupling device 44 can comprise a bracket 48 that may be joined to the end effector 24 and a detachable coupling mechanism 50 that joins the shroud 42 to the bracket 48. As shown in FIG. 2, the bracket 48 can be refastenably joined to the vacuum cup plate 30, such as by screws. The detachable coupling mechanism 50 can be any suitable type of mechanism that is capable of allowing the shroud 42 to become displaced from the bracket 48 or other portion of the safety device (or the mechanical motion device) when the safety shroud 42 makes contact with an object or person. Suitable coupling mechanisms 50 include, but are not limited to: pivotable coupling mechanisms, translatable coupling mechanisms, gimbal mounting mechanisms, magnetic coupling mechanisms, spring coupling mechanisms, and combinations thereof.

Magnetic coupling mechanisms have the advantage that they provide the coupling mechanism 50 with the ability to decouple in response to forces coming from the top, bottom, and four sides of the safety shroud 42 (that is, they are responsive to six degrees of motion). Magnetic coupling mechanisms can also assist the user of the mechanical motion device in quickly realigning and centering the safety shroud 42 after it has been decoupled from the bracket 48 due to contact with an object or person.

Figure 5:
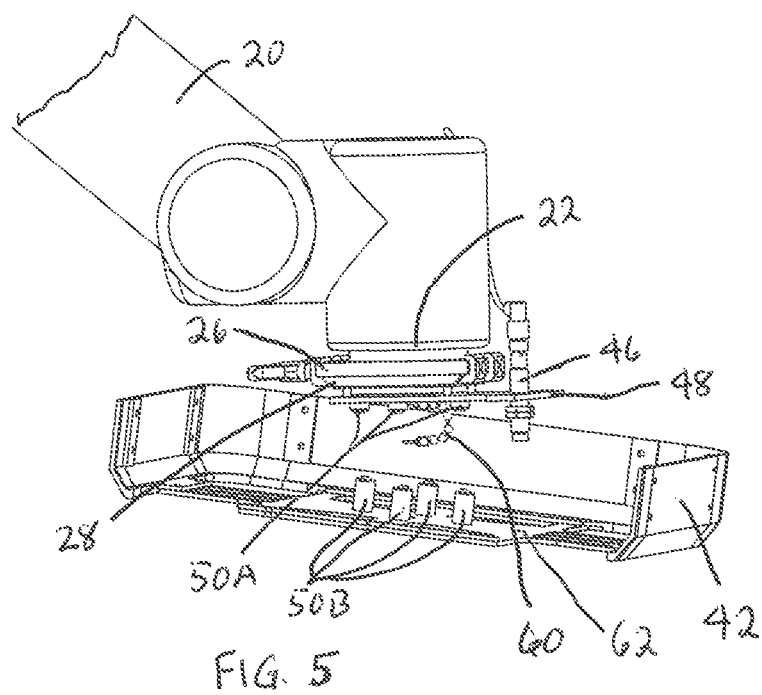
FIG. 5 is a partially fragmented perspective view showing the safety device on the end of the arm of a mechanical motion device, after the shroud has been broken away (shown without an end effector).

In the particular embodiment shown in FIGS. 1-5, a magnetic coupling mechanism 50 is used. The magnetic coupling mechanism 50 can comprise any suitable number of magnets in any suitable arrangement. In FIG. 2, a portion of the coupling device 44 is contained within the shroud 42, and is shown in subsequent drawing figures. The magnetic coupling mechanism 50, as best shown in FIG. 5 comprises four pairs of magnets that are located inboard of the shroud. In FIG. 5, the magnets with one polarity are designated 50A, and those with the opposite polarity are designated S0B. The magnets are selected so that when the safety shroud 42 makes contact with a person or an object, the opposing magnets 50A and S0B will separate from each other, and the safety shroud 42 will decouple from the bracket or other portion of the safety device or from the mechanical motion device to which it is detachably joined. If desired, the safety shroud 42 may be joined by a tether 60 or other element to the bracket 48 or other portion of the safety device or the mechanical motion device so that the safety shroud 42 does not fall to the ground.

The detection device 46 can be any suitable type of device that is capable of detecting misalignment of the safety shroud 42 from its initial aligned position and/or a collision between the shroud and a person or object. The detection device, or a component in communication therewith, may also be capable of sending a signal to the safety control system of the mechanical motion device to stop or slow the movement of the mechanical motion device. The phrase "at least slow" as used herein, includes slowing and stopping. Suitable detection devices 46 include, but are not limited to: proximity detectors, photo-eyes, ultrasonic transducers, fiber optic sensors, laser sensors, limit switches, displacement sensors (LVDT's), load cells, gyroscopes, and accelerometers. The detection device 46, or components thereof, can be joined to: one or more components of the safety device 40, the mechanical motion device, and/or the end effector 24.

In the embodiment shown in the drawings, the detection device 46 is a proximity detector that is joined to the coupling mechanism 44. The proximity detector 46 may detect metal objects. For example, the proximity detector 46 may be able to detect metal within a certain distance of its sensor, such as within a range of about 0.1 mm to about 10 mm. The proximity detector 46 will, therefore, typically not detect a plastic safety shroud 42. If a proximity detector is used, the detection device 46 may also comprise an element 62, such as a small metal disk that is provided for detection by the proximity detector 46. For example, the shroud 42 may have a small aluminum disc 62 positioned directly beneath where the proximity detector 46 is "looking". When the shroud 42 breaks-away or shifts slightly so that the metal disc 62 is no longer aligned in the sensing area of the proximity detector 46, the output is triggered and communicated to the safety control system of the mechanical motion device, such as via wire 64, and the robot slows or stops.

The magnetic coupling mechanism 50 is sufficient to hold the safety shroud 42 in position around the end effector 24 until a relatively low contact force displaces the shroud 42. For example, forces greater than or equal to about 20 N in any of the directions shown in FIG. 4 may cause the robot to slow or stop. The safety device, thus, is capable of isolating the hazardous energy of the typically rigid mechanical motion device from a collision with an external element or person.

The safety protection provided by the safety device described herein can be the sole safety circuit for the mechanical motion device; or, the safety device can be used in unison with the safety circuit of the mechanical motion device (such as a collaborative robot's safety circuit). If desired, the detection device 46 may be a "safety-rated" device. In such a case, the detection device 46 may have dual-redundant outputs (or be "fail-safe"). A safety-rated device may be a CAT3 PLd device (safety category 3/performance level d) according to ISO standard (International Organization for Standardization) for machine safety (ISO 13849). Suitable safety-rated proximity detectors are available from a variety of suppliers including: Rockwell Automation, Inc. of Milwaukee, Wis., U.S.A. (which provides Allen-Bradley products); IFM Efector, Inc. of Exton, Pa., U.S.A.; and SICK AG of Waldkirch, Germany (such as the SICK model IN30-e0407K proximity sensor).

Figure 8:
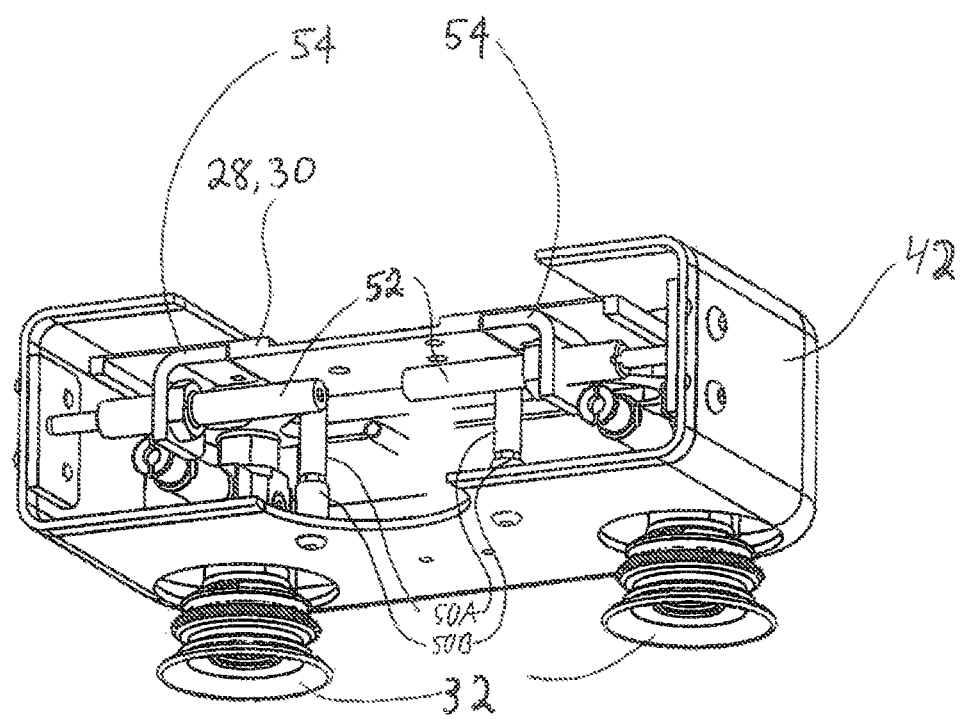
FIG. 8 is a cross-sectional view of the safety device and portion of the end effector shown in FIG. 7, taken along line 8-8 in FIG. 7.

Numerous other embodiments are also possible. For example, the coupling mechanism 44 may comprise spring coupling mechanisms in addition to, or alternatively to magnetic coupling mechanisms. Spring coupling mechanisms 52, such as shown in FIG. 8, may be particularly useful in those cases in which magnetic coupling mechanisms would have to be turned so that the interface between the magnets would be vertical, in which case shearing forces would be applied to the magnets at their interface due to gravitational force. Suitable types of spring coupling mechanisms include, but are not limited to spring plungers. Spring plungers are available from MISUMI Group, Inc., Tokyo, Japan. One suitable spring plunger is MISUMI's Part Number PJL-12-20.

Figure 6:
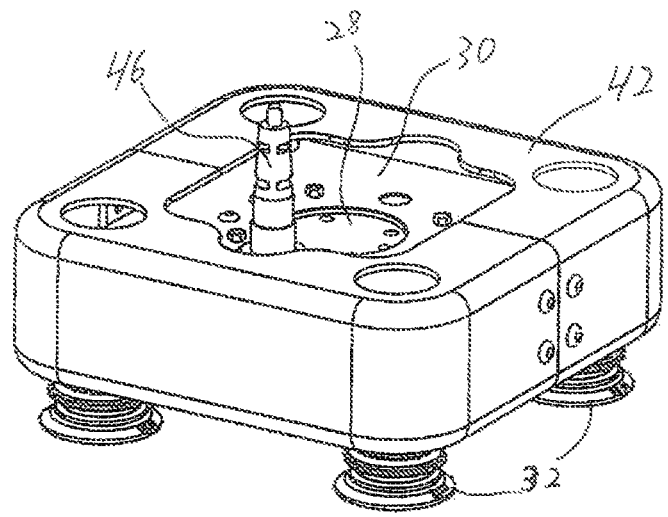
FIG. 6 is top perspective view of an alternative embodiment of the safety device and part of the end effector of the mechanical motion device.
Figure 7:
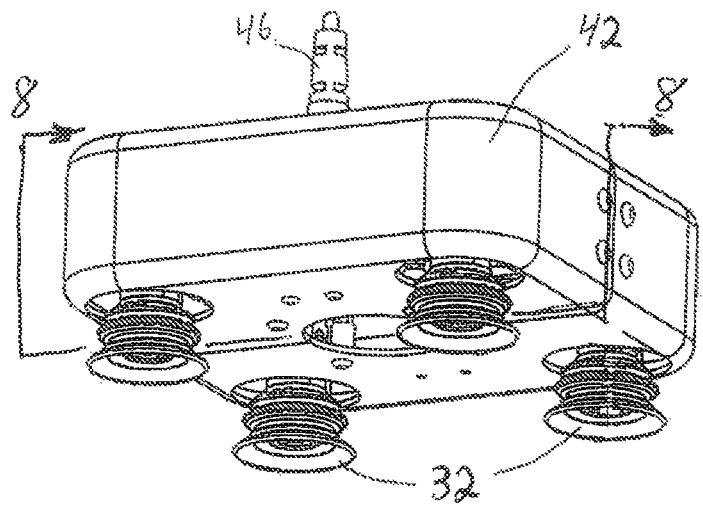
FIG. 7 is a bottom perspective view of the safety device and portion of the end effector shown in FIG. 6.

In the embodiment shown in FIGS. 6-8, the safety shroud 42 is shown in a horizontal orientation. FIG. 6 shows that the safety shroud 42 may also cover at least a portion of the top of the end effector 24, thus, at least partially surrounding the end effector 24 on six sides. In this case, the mechanical motion device may operate in both horizontal and vertical orientations, and any orientation therebetween. The mechanical motion device may pick up the articles (such as cases) from the side (with the shroud 42 vertical), and may then rotate and place articles on their bottoms (with the shroud 42 horizontal). The spring plungers 52 counter gravity when the shroud 42 is turned vertical. The spring plungers 52 may be joined to the end effector and/or the shroud 42 in any suitable manner. In the embodiment shown in FIG. 8, the spring plungers 52 are mounted on mounting brackets 54. The mounting brackets 54 may be joined to the mounting plate 28 and/or vacuum cup plate 30 (which as shown in FIG. 8 may be a single component). The spring plungers 52 exert an inward force on the shroud 42 to keep the shroud 42 from breaking away when the end effector 24 and shroud 42 are turned toward a vertical orientation.

As used herein, the term "joined to" encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A safety device for a mechanical motion device which has a safety control system and a working end, said safety device comprising:
    a) a shroud having an initial aligned position wherein said shroud completely surrounds the working end of the mechanical motion device on four sides;
    b) a magnetic coupling mechanism for coupling the shroud in a displaceable manner to the working end of a mechanical motion device; and
    c) a detection device joined to one of the other components of the safety device, or to the mechanical motion device, said coupling mechanism being configured for communication with the safety control system of a mechanical motion device, wherein said detection device is configured to: (1) detect at least one of: misalignment of said shroud from its initial aligned position and/or collision between the shroud and a person or object; and (2) send a signal to the safety control system of a mechanical motion device to at least slow the movement of the mechanical motion device.

* * * * *